US012724544B2

(12) United States Patent
Zhang et al.

(10) Patent No.: US 12,724,544 B2
(45) Date of Patent: Sep. 1, 2026

(54) STORAGE DEVICE, DATA STORAGE METHOD, AND STORAGE SYSTEM

(71) Applicant: Huawei Technologies Co., Ltd., Shenzhen (CN)

(72) Inventors: Ying Zhang, Chengdu (CN); Long Cheng, Ankara (TR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/613,617

(22) Filed: Mar. 22, 2024

(65) Prior Publication Data

US 2024/0231645 A1 Jul. 11, 2024

Related U.S. Application Data

(63) Continuation of application No. PCT/CN2022/103741, filed on Jul. 4, 2022.

(30) Foreign Application Priority Data

Sep. 23, 2021 (CN) ......................... 202111115207.X

(51) Int. Cl.
*G06F 12/08* (2016.01)
*G06F 3/06* (2006.01)
*G06F 12/0808* (2016.01)
*G06F 12/0815* (2016.01)

(52) U.S. Cl.
CPC .......... *G06F 3/0619* (2013.01); *G06F 3/0659* (2013.01); *G06F 3/0683* (2013.01)

(58) Field of Classification Search
CPC ..... G06F 3/0619; G06F 3/0659; G06F 3/0683
USPC .......................................................... 711/162
See application file for complete search history.

(56) References Cited

U.S. PATENT DOCUMENTS 8,694,724 B1 * 4/2014 Linnell ............... G06F 12/0866 711/113
11,782,624 B2 * 10/2023 Yang ....................... G06F 3/061 711/154
2010/0017649 A1 * 1/2010 Wu ..................... G06F 12/0246 714/48
2012/0246391 A1 9/2012 Meir et al.
2017/0123915 A1 * 5/2017 Nguyen ................ G06F 3/0619
2019/0056886 A1 2/2019 Nagarajan et al.
2024/0231645 A1 * 7/2024 Zhang ....................... G06F 3/06

FOREIGN PATENT DOCUMENTS

CN 106843762 A 6/2017
CN 111506262 A 8/2020
CN 112527695 A 3/2021

* cited by examiner

*Primary Examiner* — Mohamed M Gebril
(74) *Attorney, Agent, or Firm* — Slater Matsil, LLP

(57) ABSTRACT

A storage device is provided. The storage device includes a control unit, a hot spare area, and a data area. Because a quantity of bits that can be stored in a second-level storage unit corresponding to the hot spare area is less than a quantity of bits that can be stored in a first-level storage unit corresponding to the data area, data read/write performance of the hot spare area is higher than data read/write performance of the data area. In a data access process, the storage device temporarily stores target data in the hot spare area, and a data read/write speed of the storage device is consistent with a data read/write speed of the hot spare area. This improves data access efficiency of the storage device.

15 Claims, 4 Drawing Sheets

STORAGE DEVICE, DATA STORAGE METHOD, AND STORAGE SYSTEM

CROSS-REFERENCE TO RELATED APPLICATIONS

This application is a continuation of International Application No. PCT/CN2022/103741, filed on Jul. 4, 2022, which claims priority to Chinese Patent Application No. 202111115207.X filed on Sep. 23, 2021. The disclosures of the aforementioned applications are hereby incorporated by reference in their entireties.

TECHNICAL FIELD

This application relates to the field of data storage, and in particular, to a storage device, a data storage method, and a storage system.

BACKGROUND

With the development of storage media technologies, a storage capacity of a hard disk is increasing. One reason is that a single storage chip can store more and more information bits, for example, a quad-level cell (QLC), where each QLC can store 4-bit information. Compared with storage density of a single level cell (SLC) in which a single storage chip can store only 1-bit information, storage density of the QLC is increased by four times, but a read/write speed of the SLC is faster than that of the QLC.

Generally, a storage system converts a QLC for data storage into an SLC in a hard disk, or converts an SLC for data storage into a QLC in a hard disk. When more data is stored in the hard disk, the SLC occupies less storage capacity. When a used storage capacity in the hard disk reaches a specific percentage, the SLC used for read/write acceleration in the hard disk completely disappears. As a result, read/write performance of the storage system is affected.

SUMMARY

This application provides a storage device, a data storage method, and a storage system, to resolve a problem that hardware acceleration cannot be performed in the storage device.

The following technical solutions are used in this application.

According to a first aspect, this application provides a storage device, including a control unit, a hot spare area, and a data area. A storage function of the data area is provided by a first storage unit set included in the storage device, and the first storage unit set includes a plurality of first-level storage units. A storage function of the hot spare area is provided by a plurality of second-level storage units included in the storage device, and a quantity of bits that can be stored in the first-level storage unit is greater than a quantity of bits that can be stored in the second-level storage unit. In this way, the hot spare area is used as a cache of the storage device to temporarily store target data. Under a specific condition, the control unit is configured to write the target data stored in the hot spare area into the data area.

In this way, the hot spare area is used as a cache of the data area. Because a quantity of bits that can be stored in a second-level storage unit corresponding to the hot spare area is less than a quantity of bits that can be stored in a first-level storage unit corresponding to the data area, data read/write performance of the hot spare area is higher than data read/write performance of the data area. In a data access process, the storage device temporarily stores the target data in the hot spare area. When receiving a read request used to read the target data, a storage system preferentially accesses the hot spare area, so that data access efficiency of the storage device is improved. Because the hot spare area always exists in the storage device, a data caching function provided by the hot spare area does not disappear. In this way, a problem that a data read/write speed decreases caused by disappearance of an SLC in a common technology is avoided.

In addition, under a specific condition, the storage device writes (or referred to as migrates) the target data stored in the hot spare area into the data area. The data area of the storage device performs persistent storage on the target data, so that the storage device may be divided into a cache (hot spare area) and persistent storage (data area), to implement hardware acceleration inside the storage device and improve data access performance of the storage device. It should be further noted that, the hot spare area is provided by the storage device, and the hot spare area may be used as the cache of the storage device. Therefore, in a hardware acceleration scenario, there is no need to add an additional high-performance storage medium used for caching to the storage device. This reduces costs of implementing hardware acceleration by the storage device.

In an optional implementation, the first-level storage unit is one of a multi-level cell (MLC), a triple-level cell (TLC), and a QLC, and the second-level storage unit is an SLC. Alternatively, the first-level storage unit is one of a TLC and a QLC, and the second-level storage unit is one of an SLC and an MLC. Alternatively, the first-level storage unit is a QLC, and the second-level storage unit is one of an SLC, an MLC, and a TLC.

Because the quantity of bits that can be stored in the first-level storage unit is greater than the quantity of bits that can be stored in the second-level storage unit, a data read/write speed of the first-level storage unit is lower than a data read/write speed of the second-level storage unit. In a same use case, service life of the second-level storage unit is longer than service life of the first-level storage unit.

In another optional implementation, the storage device further includes a second storage unit set. The second storage unit set includes a plurality of first-level storage units. The second-level storage unit is obtained by converting the first-level storage unit included in the second storage unit set.

In another optional implementation, in a running process of the storage device, the control unit is configured to convert the first-level storage units included in the second storage unit set into the plurality of second-level storage units. In a possible case, if all storage units included in the storage device are first-level storage units at delivery, in this embodiment, the first-level storage units may be converted into the plurality of second-level storage units, and then the plurality of second-level storage units provide cache space for the hot spare area, so that the hot spare area implements a cache function of the storage device, to implement hardware acceleration inside the storage device and improve data access performance of the storage device.

In another optional implementation, the control unit is specifically configured to: when storage space of the hot spare area is insufficient to store the target data, convert the first-level storage units included in the second storage unit set into the plurality of second-level storage units.

In this way, when space used for temporarily caching data in the hot spare area is insufficient, a storage unit that provides storage space for the hot spare area in the storage device may be converted. For example, the first-level storage unit is converted into the second-level storage unit, for example, a QLC is converted into an SLC, so that the storage device may temporarily store data by using the second-level storage unit obtained through conversion. In this way, a data read/write speed of a data access service provided externally by the storage device is consistent with the data read/write speed of the second-level storage unit.

In another optional implementation, when a hard disk in the storage device is faulty, the control unit is further configured to convert the second-level storage unit into the first-level storage unit. The first-level storage unit obtained through conversion is used to restore data stored in the hard disk.

If the hard disk is faulty, after cached data in the hot spare area (for example, storage space provided by the SLC) is cleared, the data does not affect service data actually stored in the data area (for example, storage space provided by the QLC). Therefore, the service data stored in the hard disk is not affected by the cached data in the hot spare space. The control unit converts the second-level storage unit (for example, the SLC) that provides storage space for the hot spare area into the first-level storage unit (for example, the QLC), and uses the first-level storage unit to recover data in the faulty hard disk. This ensures data reliability of the storage device.

According to a second aspect, this application provides a data storage method. The method is performed by a storage device, or the method is performed by a storage system that supports implementation of the storage device. The data storage method includes: First, a first storage unit set included in the storage device provides a data area, where the first storage unit set includes a plurality of first-level storage units, a plurality of second-level storage units included in the storage device provide a hot spare area, and a quantity of bits that can be stored in the first-level storage unit is greater than a quantity of bits that can be stored in the second-level storage unit; second, the hot spare area serves as a cache of the storage device and temporarily stores the target data; and finally, the control unit included in the storage device writes the target data stored in the hot spare area into the data area under a specific condition.

In a data access process, the storage device temporarily stores the target data in the hot spare area. When receiving a read request used to read the target data, the storage system preferentially accesses the hot spare area. Therefore, when the storage device provides a data access service externally, a data read/write speed of the storage device is consistent with a data read/write speed of the hot spare area. Because a quantity of bits that can be stored in a second-level storage unit corresponding to the hot spare area is less than a quantity of bits that can be stored in a first-level storage unit corresponding to the data area, data read/write performance of the hot spare area is higher than data read/write performance of the data area. This improves data access efficiency of the storage device. Because the hot spare area always exists in the storage device, a data caching function provided by the hot spare area does not disappear. In this way, a problem that a data read/write speed decreases caused by disappearance of an SLC in a common technology is avoided.

In an optional implementation, the first-level storage unit is one of an MLC, a TLC, and a QLC, and the second-level storage unit is an SLC. Alternatively, the first-level storage unit is one of a TLC and a QLC, and the second-level storage unit is one of an SLC and an MLC. Alternatively, the first-level storage unit is a QLC, and the second-level storage unit is one of an SLC, an MLC, and a TLC.

In another optional implementation, the storage device further includes a second storage unit set. The second storage unit set includes a plurality of first-level storage units. The second-level storage unit is obtained by converting the first-level storage unit included in the second storage unit set.

In another optional implementation, the data storage method further includes: In a running process of the storage device, the control unit converts the first-level storage units included in the second storage unit set into the plurality of second-level storage units.

In another optional implementation, that the control unit converts the first-level storage units included in the second storage unit set into the plurality of second-level storage units includes: when storage space of the hot spare area is insufficient to store the target data, converting the first-level storage units included in the second storage unit set into the plurality of second-level storage units.

In another optional implementation, the data storage method further includes: When a hard disk in the storage device is faulty, the control unit is configured to convert the second-level storage unit into the first-level storage unit. The first-level storage unit obtained through conversion is used to restore data stored in the hard disk.

In another optional implementation, the data storage method further includes: The control unit obtains a first read request used to request the target data, and reads the target data from a first-level storage unit indicated by a first identifier included in the first read request. The first identifier indicates that the target data is stored in the first-level storage unit of the data area. For example, if the target data is first data, when the control unit obtains the first read request used to request the first data, the storage device may read the first data from a QLC indicated by a QLC identifier (identifier, ID) included in the first read request. The QLC ID indicates that the first data is stored in a QLC of the data area. The control unit may parse the QLC ID to determine a physical chunk (chunk) in which the first data is stored.

In another optional implementation, the data storage method further includes: The control unit obtains a second read request used to request the target data, and reads the target data from a second-level storage unit indicated by a second identifier included in the second read request. The second identifier indicates that the target data is stored in the second-level storage unit of the data area. For example, if the target data is second data, when the control unit obtains the second read request used to request the second data, the storage device may read the second data from an SLC indicated by an SLC ID included in the second read request. The SLC ID indicates that the first data is stored in an SLC of the data area. The control unit may parse the SLC ID to determine a physical chunk in which the second data is stored.

In this way, the storage device may determine a read location or a write location of the target data based on a storage unit ID (or referred to as a data flow ID) included in a read request or a write request. This improves a data read/write speed of the storage device, so that data access performance of the storage device is improved.

In another optional implementation, the data storage method further includes: For each first-level storage unit included in the first storage unit set, the control unit collects statistics on a quantity of erase times of the first-level storage unit, and performs wear protection on a first-level storage unit whose quantity of erase times reaches a first threshold.

For example, the control unit converts the first-level storage unit whose quantity of erase times reaches the first threshold into the second-level storage unit. The first-level storage unit is converted into the second-level storage unit. This may improve a quantity of remaining available times of the second storage unit obtained through conversion in the storage device, so that service life of the storage device is extended and wear leveling of the storage device is implemented.

For another example, the control unit migrates data stored in the first-level storage unit whose quantity of erase times reaches the first threshold to a first-level storage unit whose quantity of erase times does not reach the first threshold. Data is migrated between storage units of a same type in the storage device, to balance service life of a plurality of storage units that are of a same type, so that load balancing of the storage units in the storage device is achieved, and overall service life of the storage device is extended.

According to a third aspect, this application provides a storage system, including a controller and the storage device according to any one of the first aspect or the second aspect. The controller is configured to obtain target data, and send the target data to the storage device. The storage device is configured to temporarily store the target data in a hot spare area included in the storage device, and write, under a specific condition, the target data from the hot spare area into a data area included in the storage device.

The storage system may further implement a function in any one of the implementations of the first aspect and the second aspect. For beneficial effects, refer to descriptions of any one of the first aspect and the second aspect. Details are not described herein again.

According to a fourth aspect, this application provides a data storage apparatus. The data storage apparatus is used in a storage device, and the data storage apparatus includes each module configured to perform any one of the possible implementations of the first aspect and the second aspect.

For beneficial effects, refer to descriptions of any one of the first aspect and the second aspect. Details are not described herein again. The data storage apparatus has a function of implementing behavior in the instance of any one of the first aspect and the second aspect. The function may be implemented by hardware, or may be implemented by hardware executing corresponding software. The hardware or the software includes one or more modules corresponding to the foregoing function.

According to a fifth aspect, this application provides a chip, including a memory and a processor. The memory is configured to store computer instructions. When the processor invokes the computer instructions from the memory and runs the computer instructions, the operation steps of the method in any possible implementation of the second aspect are implemented.

According to a sixth aspect, this application provides a computer-readable storage medium. The storage medium stores a computer program or instructions, and when the computer program or the instructions are executed by a processor or a storage device, the operation steps of the method in any possible implementation of the second aspect are implemented.

According to a seventh aspect, this application provides a computer program product. When the computer program product runs on a communication device, for example, a computer, a server, or the like, a processor or a storage device is enabled to perform operation steps of the method in any possible implementation of the second aspect.

In this application, based on the implementations according to the foregoing aspects, the implementations may be further combined to provide more implementations.

DETAILED DESCRIPTION OF ILLUSTRATIVE EMBODIMENTS

For clear and brief description of the following embodiments, a related technology is briefly described first.

Figure 1:
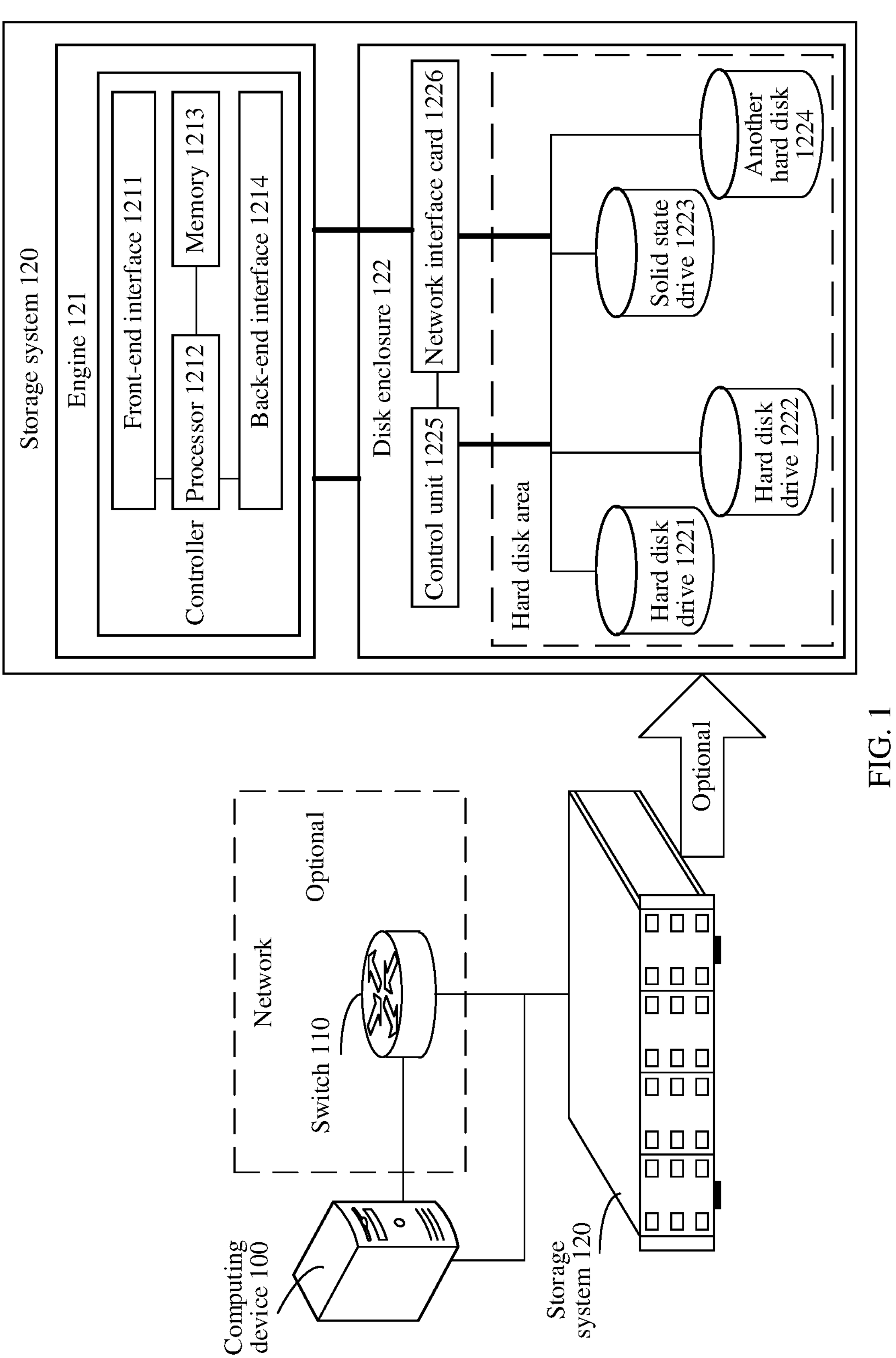
FIG. 1 is a schematic diagram of a data storage system according to this application.

FIG. 1 is a schematic diagram of a data storage system according to this application. The data storage system includes a computing device 100 and a storage system 120. In an application scenario shown in FIG. 1, a user accesses data by using applications. A computer running these applications may be referred to as a "computing device". The computing device 100 may be a physical machine, or may be a virtual machine. The physical computing device includes but is not limited to a desktop computer, a server, a notebook computer, and a mobile device.

In a possible example, the computing device 100 accesses the storage system 120 through a network to access data, for example, the network may include a switch 110.

In another possible example, the computing device 100 may alternatively communicate with the storage system 120 via a wired connection, for example, a universal serial bus (USB), a peripheral component interconnect express (PCIe) bus, or the like.

The storage system 120 shown in FIG. 1 may be a centralized storage system. The centralized storage system features one unified portal, and all data from an external device passes through this portal. The portal is an engine 121 of the centralized storage system. The engine 121 is a core component of the centralized storage system, and many advanced functions of the storage system are implemented in the engine 121.

As shown in FIG. 1, the engine 121 may include one or more controllers. An example in which the engine 121 includes one controller is used for description in FIG. 1. In a possible example, if the engine 121 includes a plurality of controllers, a mirror channel may exist between any two controllers, to implement a function of mutual backup of any two controllers. In this way, unavailability of the entire storage system 120 caused by a hardware fault is avoided.

The engine 121 further includes a front-end interface 1211 and a back-end interface 1214. The front-end interface 1211 is configured to communicate with the computing device 100, to provide a data access service for the computing device 100. The back-end interface 1214 is configured to communicate with a hard disk, to expand a capacity of the storage system 120. The engine 121 may connect to more hard disks through the back-end interface 1214, to form a large storage resource pool.

In terms of hardware, as shown in FIG. 1, the controller includes at least a processor 1212 and a memory 1213. The processor 1212 is one central processing unit (CPU), configured to process a data access request from outside (a server or another storage system) of the storage system 120, and is also configured to process a request generated inside the storage system 120. For example, when receiving, through the front-end interface 1211, a data write request sent by the computing device 100, the processor 1212 temporarily stores data in the data write request in the memory 1213. When a total amount of data in the memory 1213 reaches a specific threshold, the processor 1212 sends, through the back-end port, the data stored in the memory 1213 to at least one of the hard disk drive 1211, a hard disk drive 1222, a solid state drive (SSD) 1223, or another hard disk 1224 for persistent storage.

The memory 1213 is an internal memory that directly exchanges data with the processor. The memory 1213 can read and write the data at a fast speed at any time, and serves as a temporary data memory of an operating system or another running program. The memory includes at least two types of memories. For example, the memory may be a random access memory, or may be a read-only memory (ROM). For example, the random access memory is a DRAM or an SCM. The DRAM is a semiconductor memory, which is a volatile memory device like most random access memories (RAMs). However, the DRAM and the SCM are merely examples for description in this embodiment, and the memory may further include another random access memory, for example, a static random access memory (SRAM) and the like. The read-only memory, for example, may be a programmable read-only memory (PROM), an erasable programmable read-only memory (EPROM), or the like.

In addition, the memory 1213 may alternatively be a dual in-line memory module or a dual in-line memory module (DIMM), in other words, a module including a dynamic random access memory (DRAM), or may be an SSD. In actual application, a plurality of memories 1213 and different types of memories 1213 may be configured in the controller. The quantity and the types of the memories 1213 are not limited in the embodiments. In addition, the memory 1213 may be configured to have a power failure protection function. The power failure protection function means that data stored in the memory 1213 is not lost even when a system is powered on again after a power failure. A memory with a power failure protection function is called a non-volatile memory.

The memory 1213 stores a software program, and the processor 1212 may run the software program in the memory 1213 to manage the hard disk. For example, the hard disk is abstracted into a storage resource pool, and the storage resource pool is provided for the server in a form of a logical unit number (logical unit number, LUN). The LUN herein is actually the hard disk seen on the server. Of course, some centralized storage systems are also file servers and can provide file sharing services for the server.

As shown in FIG. 1, in the system, the engine 121 may not have a hard disk slot, a hard disk needs to be placed in a disk enclosure 122, and the back-end interface 1214 communicates with the disk enclosure 122. The back-end interface 1214 exists in the engine 121 in a form of an adapter, and one engine 121 may connect to a plurality of disk enclosures through two or more back-end interfaces 1214. Alternatively, the adapter may be integrated in a mainboard. In this case, the adapter may communicate with the processor 1212 through a PCIe bus.

It should be noted that FIG. 1 shows only one engine 121. However, in an actual application, the storage system may include two or more engines 121, and redundancy or load balancing is performed between the plurality of engines 121.

The disk enclosure 122 includes a control unit 1225 and a plurality of hard disks. The control unit 1225 may have a plurality of forms. In one case, the disk enclosure 122 belongs to a smart disk enclosure. As shown in FIG. 1, the control unit 1225 includes a CPU and a memory. The CPU is configured to perform operations such as address translation, data reading and writing, and the like. The memory is configured to temporarily store data that is to be written into the hard disk, or data this is read from the hard disk and that is to be sent to the controller. In another case, the control unit 1225 is a programmable electronic component, for example, a data processing unit (data processing unit, DPU). The DPU has versatility and programmability of the CPU, but is more specialized, and can run efficiently on a network data packet, a storage request, or an analysis request. The DPU is distinguished from the CPU by a high degree of parallelism (which requires processing a large quantity of requests). Optionally, the DPU herein may alternatively be replaced with a processing chip such as a graphics processing unit (graphics processing unit, GPU) or an embedded neural-network processing unit (neural-network processing unit, NPU). Generally, there may be one, two, or more control units 1225. A function of the control unit 1225 may be offloaded to a network interface card 1226. In other words, in this implementation, the disk enclosure 122 does not have the control unit 1225, but the network interface card 1226 completes data reading/writing, address translation, and other calculation functions. In this case, the network interface card 1226 is an intelligent network interface card. The intelligent network interface card may include a CPU and a memory. The CPU is configured to perform operations such as address translation, data reading and writing, and the like. The memory is configured to temporarily store data that is to be written into the hard disk, or data this is read from the hard disk and that is to be sent to the controller. The intelligent network interface card may alternatively be a programmable electronic component, for example, a DPU. There is no belonging relationship between the network interface card 1226 and a hard disk that are in the disk enclosure 122. The network interface card 1226 can access any hard disk (for example, the hard disk drive 1221, the hard disk drive 1222, the solid state drive 1223, and another hard disk 1224 shown in FIG. 1) in the disk enclosure 122. Therefore, hard disk expansion is easier when storage space is insufficient.

Based on a type of a communication protocol between the engine 121 and the disk enclosure 122, the disk enclosure 122 may be a disk enclosure of a serial attached small computer system interface (serial attached small computer system interface, SAS), or may be a NVMe (Non-Volatile Memory express) disk enclosure or another type of disk enclosure. The SAS disk enclosure uses an SAS 3.0 protocol. Each enclosure supports 25 SAS hard disks. The engine 121 is connected to the disk enclosure 122 through an onboard SAS interface or SAS interface module. The NVMe disk enclosure is more like a complete computer system. An NVMe disk is inserted into the NVMe disk enclosure. Then the NVMe disk enclosure connects to the engine 121 through an RDMA port.

In an optional implementation, the storage system 120 is a centralized storage system with integrated disks and controllers. The storage system 120 does not have the foregoing disk enclosure 122, and the engine 121 is configured to manage a plurality of hard disks connected through disk slots. A function of the hard disk slot may be implemented by the back-end interface 1214.

In another optional implementation, the storage system 120 shown in FIG. 1 is a distributed storage system. The distributed storage system includes a computing device cluster and a storage device cluster. The computing device cluster includes one or more computing devices, and the computing devices may communicate with each other. The computing device may be a computing device, for example, a server, a desktop computer, or a controller of a storage array. In terms of hardware, the computing device may include a processor, a memory, a network interface card, and the like. The processor is a CPU, and is configured to process a data access request from outside the computing device or a request generated inside the computing device. For example, when receiving data write requests sent by a user, the processor temporarily stores data in the data write requests in the memory. When a total amount of data in the memory reaches a specific threshold, the processor sends the data stored in the memory to a storage device for persistent storage. In addition, the processor is further configured to perform calculation or processing on data, for example, metadata management, deduplication, data compression, virtualized storage space, address translation, and the like. In an example, any computing device may access any storage device in the storage device cluster through a network. The storage device cluster includes a plurality of storage devices. One storage device includes one or more controllers, a network interface card, and a plurality of hard disks. The network interface card is configured to communicate with the computing device.

Herein, the storage system 120 shown in FIG. 1 is used as an example to describe in detail an implementation of this embodiment of this application.

The solid state drive 1223 includes a control chip and a flash (Flash) chip configured to store data. The flash chip uses a transistor which is called a "floating gate field effect transistor" to store data. Each such transistor is called a cell, that is, a unit. Based on storage density, the cell can be classified into an SLC and an MLC.

Figure 2:
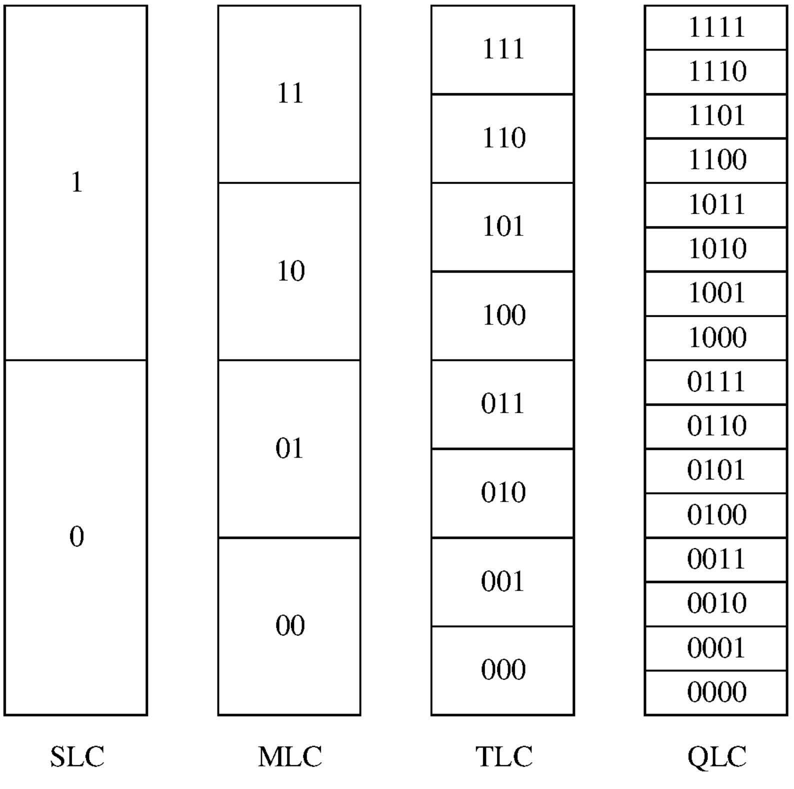
FIG. 2 is a schematic diagram of data storage of a storage unit according to this application.

FIG. 2 is a schematic diagram of data storage of a storage unit according to this application. For the SLC, each cell stores 1-bit information, in other words, there are only two types of voltage changes: 0 and 1. The cell has a simple structure and fast voltage control, and is characterized by long service life, high performance, and a quantity of programmable/erase (programmable/erase, P/E) times between 10,000 and 100,000. However, a low capacity and high costs are disadvantages of the cell, after all, one cell can store only 1-bit information. The quantity of P/E times may also be referred to as P/E service life.

For the MLC, each cell stores 2-bit information and requires more complex voltage control. There are four changes: 00, 01, 10, and 11. This means that write performance and reliability are reduced. P/E service life of the MLC varies from 3000 to 5000 times, depending on different manufacturing processes. It can be seen that a capacity of the MLC is twice that of the SLC, but costs of the MLC are almost the same as those of the SLC. Therefore, for an SSD with a same capacity, costs of an MLC chip are much lower than those of an SLC chip. In addition, each cell can store four states, and complexity of the MLC is high. Therefore, an error rate is high. Both the SLC and MLC need to additionally save ECC check information for data error recovery.

In addition, the cell may further include a TLC and a QLC. As shown in FIG. 2, for the TLC, each cell stores 3-bit information, and there are eight variations of a voltage from 000 to 001. Compared with the capacity of the MLC, a capacity of the TLC is further increased by ⅓, and costs are lower. However, the TLC has a more complex architecture, and is characterized by long P/E programming time, a slow write speed, and P/E service life being reduced to 1000 to 3000 times. In some cases, the P/E service life is shorter. The short P/E service life is only relative. It is tested that a TLC cell-based solid state drive can be normally used for more than five years. The QLC is also called a 4-bit MLC. There are 16 variations of a voltage, but a storage capacity of a single cell can be increased by 33%, and write performance and a P/E service life are further reduced compared with those of the TLC.

Figure 3:
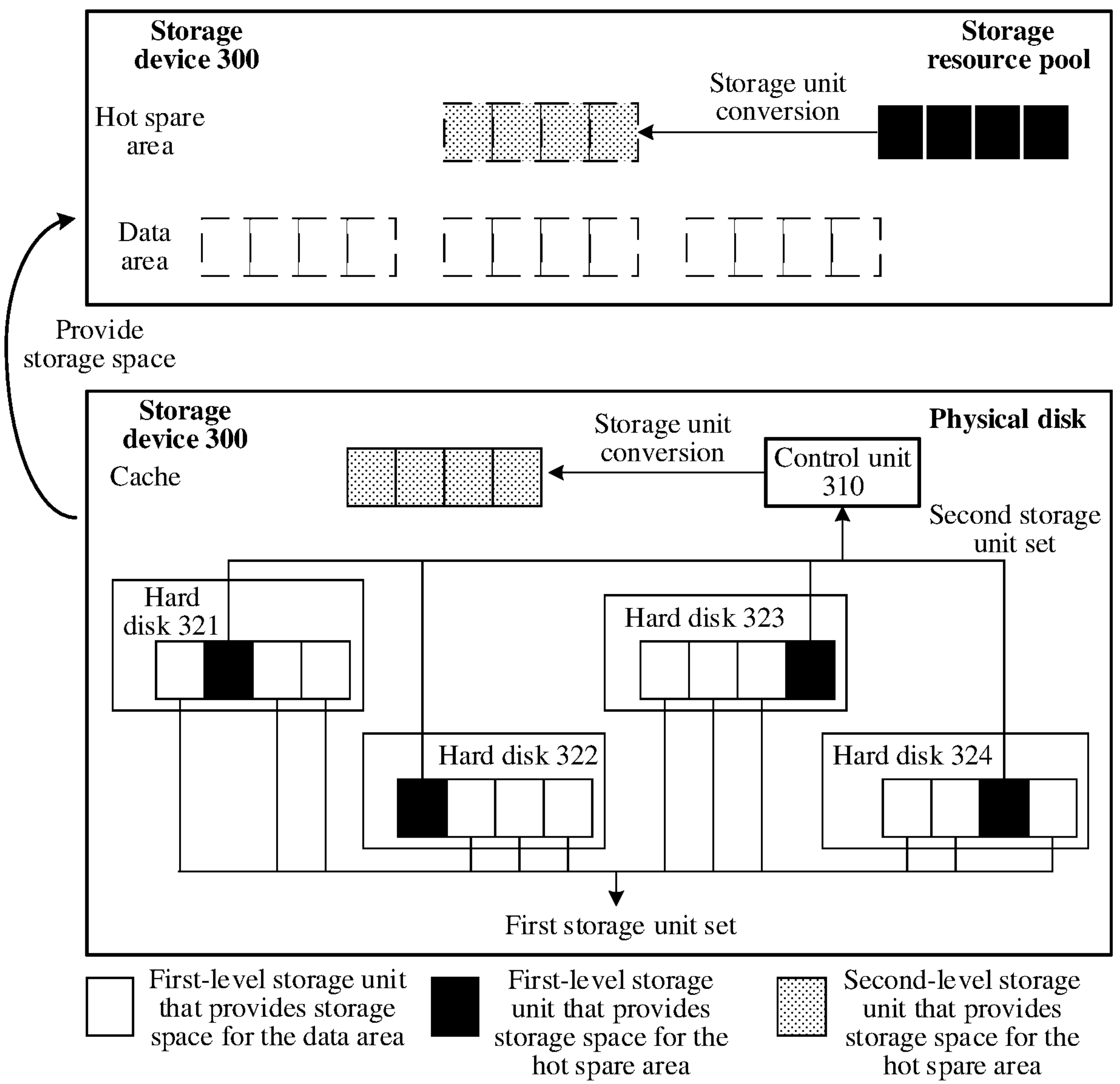
FIG. 3 is a schematic diagram of a storage device according to this application.

To implement hardware acceleration of a storage device and improve read/write performance of a data storage system, this application provides a storage device. FIG. 3 is a schematic diagram of a storage device according to this application. The storage device 300 may be the disk enclosure 122 shown in FIG. 1.

In a possible implementation, when the storage system 120 is a centralized storage system with integrated disks and controllers, the storage device 300 is the centralized storage system with integrated disks and controllers.

In another possible implementation, the storage device 300 may further be a hard disk that includes a control chip and a flash chip. For example, the control chip is configured to implement a function of a control unit, and the flash chip is configured to implement a function of a storage unit.

Herein, an example in which the storage device 300 is the disk enclosure 122 shown in FIG. 1 is used for description. In actual implementation of a product, storage space provided by the storage device 300 for a host or a computing device is only a segment of logical address space. A hardware relationship between the logical address space and the storage device 300 is shown in FIG. 3. The logical address space provided by the storage device 300 for the host or the computing device is a storage resource pool (storage resource pool), for example, a hot spare area and a data area included in the storage device 300.

In some possible cases, the storage resource pool may alternatively be a logical disk used to store data.

As shown in FIG. 3, in the storage resource pool, the data area and the hot spare area use different logical address space.

The data area is storage space used for persistent data storage in the storage resource pool. In hardware implementation, a storage function of the data area is provided by a physical disk included in the storage device 300. For example, storage space of the data area is provided by a first storage unit set, and the first storage unit set includes a plurality of first-level storage units (small white squares shown in FIG. 3). The first storage unit set is obtained by dividing first-level storage units included in a plurality of physical disks (for example, a hard disk 321 to a hard disk 324) by the storage device 300.

In addition, the storage unit may further use first-level storage units other than the first storage unit set in a plurality of hard disks as a second storage unit set. The second storage unit set also includes a plurality of first-level storage units, and the plurality of first-level storage units may provide storage space that is used for data backup, snapshot, or clone for a hot spare area. For example, the hot spare area is used to implement a failover mechanism of the storage device, and provide reliability for a data access function provided by the storage. For example, when part of the data area is faulty and becomes unavailable, the hot spare area is switched to a running state to take over a storage function provided by the faulty area in the data area.

It should be noted that the storage device 300 may divide the plurality of hard disks. Some hard disks are configured to provide the plurality of first-level storage units included in the first storage unit set, and the other hard disks are configured to provide the plurality of first-level storage units included in the second storage unit set.

Optionally, the hard disk in the storage device 300 provides first-level storage units for the first storage unit set and the second storage unit set simultaneously. As shown in FIG. 3, the hard disk 321 is divided into four parts. A first-level storage unit of one part is configured to provide storage space for the hot spare area, and first-level storage units of the other three parts are configured to provide storage space for the data area.

In this embodiment, the hot spare area may be used as a cache of the storage device 300 to temporarily store target data. When the hot spare area is used as the cache, a storage function of the hot spare area is provided by a plurality of second-level storage units (for example, small squares filled with spots in FIG. 3) included in the storage device 300. The second-level storage unit is obtained by converting the first-level storage unit included in the second storage unit set, and a quantity of bits that can be stored in the first-level storage unit is greater than a quantity of bits that can be stored in the second-level storage unit.

In a first possible example, the first-level storage unit is one of an MLC, a TLC, and a QLC, and the second-level storage unit is an SLC.

In a second possible example, the first-level storage unit is one of a TLC and a QLC, and the second-level storage unit is one of an SLC and an MLC.

In a third possible example, the first-level storage unit is a QLC, and the second-level storage unit is one of an SLC, an MLC, and a TLC.

Optionally, the second-level storage units are obtained by converting the plurality of first-level storage units included in the second storage unit set in the storage device 300. For example, if the first-level storage unit is a QLC, and the second-level storage unit is an SLC, one QLC may be converted into four SLCs. For another example, if the first-level storage unit is a QLC, and the second-level storage unit is a TLC, one QLC may be converted into two TLCs.

It should be noted that the SLC, the MLC, the TLC, and the QLC are merely examples of the storage unit provided in this embodiment. With development of storage technologies, the storage unit provided in this application may alternatively be a storage unit that can store more bits in one cell. For example, one cell may store 5-bit information, 6-bit information, or information of more bits. This is not limited in this application.

As shown in FIG. 3, in hardware implementation, the storage device 300 includes a control unit 310 and a plurality of hard disks, such as the hard disk 321, a hard disk 322, a hard disk 323, and the hard disk 324 shown in FIG. 3. The control unit 310 may implement a function of the control unit 1225 shown in FIG. 1. The hard disk 321 to the hard disk 324 may be hard disks of a same type (for example, a QLC SSD), or may be hard disks of different types. This is not limited in this application.

In an optional example, when a plurality of physical disks (the hard disk 321 to the hard disk 324 shown in FIG. 3) corresponding to the storage device 300 are in an initial state, for example, in an unused state, all storage media of the physical disks are QLCs (first-level storage units), that is, the hard disk 321 to the hard disk 324 are all QLC SSDs. In this case, the QLCs included in the hard disk 321 to the hard disk 324 may be divided into a first storage unit set and a second storage unit set.

The first storage unit set includes a plurality of first storage units (small white squares shown in a physical disk in FIG. 3), and the plurality of first storage units may provide logical address space used for storage for the data area in the storage resource pool.

The second storage unit set includes a plurality of first storage units (small black squares shown in a physical disk in FIG. 3), and the plurality of first storage units may provide logical address space used for storage for the hot spare area in the storage resource pool.

Optionally, a specific implementation process in which the storage device 300 provides logical address space for the storage resource pool may include the following content.

First, the storage device 300 may report storage space information to a controller (for example, the controller included in the engine 121 in FIG. 1). The storage space information may include information such as a type of each hard disk in the storage device 300 and a storage capacity that can be provided by the hard disk.

Second, the controller provides storage space for the hot spare area and the data area based on the storage space information reported by the storage device 300.

For example, it is assumed that all hard disks included in the storage device 300 are QLC SSDs. The control unit 310 in the storage device 300 reports storage space information to the controller. The controller constructs a storage resource pool based on the storage space information, user setting information, and the like, and configures areas such as metadata space, a data area, hot spare space (or referred to as a hot spare area), and reserved space. Then, the controller included in the storage system uses part of the hot spare area as a read cache area. For example, the controller uses one quarter of the hot spare area as the read cache area, and an SLC obtained by converting a QLC provides storage space for the read cache area.

For example, in a running process of the storage device 300, the plurality of first storage unit sets included in the second storage unit set may be converted into second-level storage units (small squares filled with spots shown in a physical disk in FIG. 3), and the second-level storage unit may provide logical address space used for caching for the hot spare area.

In a possible specific example, if storage space of the hot spare area is insufficient for temporarily storing target data, the control unit 310 may convert the first-level storage units included in the second storage unit set into a plurality of second-level storage units.

In this way, when space used for temporarily caching data in the hot spare area is insufficient, a storage unit that provides storage space for the hot spare area in the storage device 300 may be converted. For example, the first-level storage unit is converted into the second-level storage unit, for example, a QLC is converted into an SLC, so that the storage device may temporarily store data by using the second-level storage unit obtained through conversion. In this way, a data read/write speed of a data access service provided externally by the storage device is consistent with a data read/write speed of the second-level storage unit.

Because a quantity of bits that can be stored in one first-level storage unit is greater than a quantity of bits that can be stored in one second-level storage unit, a data read/write speed of the second-level storage unit is greater than a data read/write speed of the first-level storage unit. That is, a data read/write speed of the storage device in an initialized state is consistent with that of the first-level storage unit. In this embodiment, a data read/write speed of a data access service provided externally by the storage device is consistent with that of the second-level storage unit, so that the data read/write speed of the storage device is improved, and data access performance of the storage device is further improved.

In addition, because the quantity of bits that can be stored in the first-level storage unit is greater than the quantity of bits that can be stored in the second-level storage unit, the data read/write speed of the first-level storage unit is lower than the data read/write speed of the second-level storage unit. In a same use case, refer to related descriptions in FIG. 2 and FIG. 3. A quantity of P/E times (service life) of the second-level storage unit is greater than a quantity of P/E times (service life) of the first-level storage unit.

Figure 4:
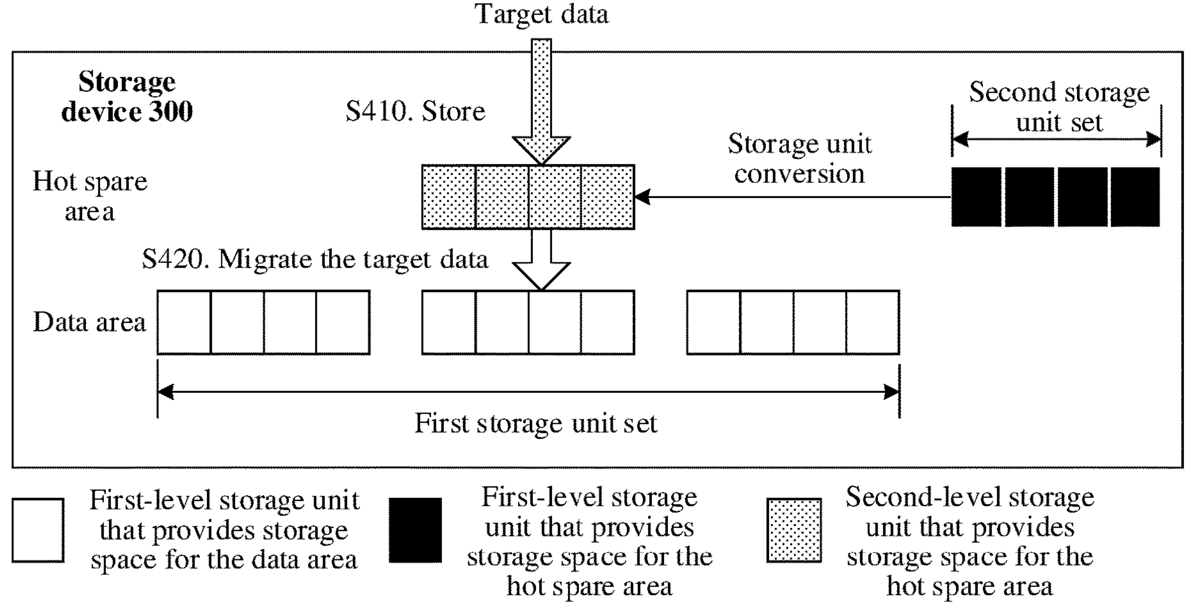
FIG. 4 is a flowchart of a data storage method according to this application.

Based on the storage device 300 shown in FIG. 3, to implement data access, this application provides a data storage method. FIG. 4 is a flowchart of a data storage method according to this application. The storage device 300 provides a storage resource pool for a host or a computing device. The storage resource pool includes a data area and a hot spare area. For specific implementation of the storage device 300, refer to related content in FIG. 3. Details are not described herein again. The data storage method includes the following steps.

S410. The control unit 310 stores obtained target data in the hot spare area.

First, because a quantity of bits that can be stored in a first-level storage unit is greater than a quantity of bits that can be stored in a second-level storage unit, a data read/write speed of the first-level storage unit is lower than a data read/write speed of the second-level storage unit. In addition, a storage function of the hot spare area is provided by the second-level storage unit, and a storage function of the data area is provided by the first-level storage unit. Therefore, a data read/write speed of the hot spare area is higher than a data read/write speed of the data area, and the hot spare area in the storage device 300 is used as a cache of the data area. This improves performance of reading/writing external data (for example, the foregoing target data) of the storage device 300.

S420. The control unit 310 writes the target data stored in the hot spare area into the data area under a specific condition.

In a first possible case, the specific condition may be that a data amount stored in the hot spare area reaches a threshold, for example, 100 megabytes (megabytes, MB) or 20 MB.

In a second possible case, the specific condition may be that the target data is stored in the hot spare area for specified duration. For example, when the duration of storing the target data in the hot spare area reaches one minute or one day, the storage device 300 migrates the target data stored in the hot spare area to the data area.

In a third possible case, the specific condition may be that an available capacity of the hot spare area is less than a capacity threshold, for example, 10 MB, 5 MB, or 2 MB.

The foregoing three possible cases are merely examples provided in this embodiment, and should not be construed as a limitation on this application.

In this way, the hot spare area is used as the cache of the data area. Because a quantity of bits that can be stored in a second-level storage unit corresponding to the hot spare area is less than a quantity of bits that can be stored in a first-level storage unit corresponding to the data area, data read/write performance of the hot spare area is higher than data read/write performance of the data area. In a data access process, the storage device temporarily stores the target data in the hot spare area. When receiving a read request used to read the target data, the storage system preferentially accesses the hot spare area, so that when the storage device provides a data access service externally, the data read/write speed of the storage device is consistent with the data read/write speed of the hot spare area, and data access efficiency of the storage device is improved. Because the hot spare area always exists in the storage device, a data caching function provided by the hot spare area does not disappear. In this way, a problem that a data read/write speed decreases caused by disappearance of an SLC in a common technology is avoided.

In addition, under a specific condition, the storage device writes (or referred to as migrates) the target data stored in the hot spare area into the data area. The data area of the storage device performs persistent storage on the target data, so that the storage device may be divided into a cache (hot spare area) and persistent storage (data area), to implement hardware acceleration inside the storage device and improve data access performance of the storage device.

It should be further noted that, the hot spare area is provided by the storage device, and the hot spare area may be used as the cache of the storage device. Therefore, in a hardware acceleration scenario, there is no need to add an additional high-performance storage medium used for caching to the storage device. This reduces costs of implementing hardware acceleration by the storage device.

In an optional implementation, the storage device 300 may write the target data into different storage units based on cold and hot information of the target data. The cold and hot information is a quantity of times that the target data is accessed in a unit time, or is referred to as an access frequency of the target data. If the access frequency of the target data is higher than a frequency threshold, the target data is hot data.

In a possible example, a write request may carry an identifier that indicates the cold and hot information of the target data, for example, the identifier is a data flow ID. In a possible case, the data flow ID not only indicates cold and hotness of the target data, but also indicates a type of a storage unit in which the target data is to be stored in the storage device 300. The storage device 300 may quickly access the target data based on the data flow ID. In this way, data access efficiency of the storage device is improved.

For example, if target data included in the write request is cold data, the data flow ID may be a QLC ID. The storage device 300 may write the target data into a QLC in the storage device 300 based on the QLC ID included in the write request. The QLC may be a first-level storage unit that provides storage space for the data area.

For another example, if target data included in the write request is hot data, the data flow ID may be an SLC ID. The storage device 300 may write the target data into an SLC in the storage device 300 based on the SLC ID included in the write request. The SLC may be a second-level storage unit that provides storage space for the hot spare area.

It should be noted that the QLC ID and the SLC ID are merely examples provided for describing the data flow ID. When the data flow ID is used to determine a type of a storage unit in which to-be-written data is to be stored, the data flow ID may be generated based on cold and hot information of the to-be-written data by a controller (the controller shown in FIG. 1) in a storage system in which the storage device is located, or may be specified by a client (for example, a host, or another computing device that communicates with the storage system or the storage device).

Correspondingly, to enable the storage device 300 to read data from the hot spare area and the data area, a read request may carry the foregoing data flow ID.

For example, if the target data is cold data, when the control unit 310 obtains a first read request used to request the target data, the storage device 300 may read the target data from a QLC indicated by a QLC ID included in the first read request. The QLC ID indicates that the target data is stored in a QLC of the data area. The control unit 310 may parse the QLC ID to determine a physical chunk (chunk) in which the target data is stored. For example, the chunk is a first-level storage unit (a small white square in the physical disk 300B) that provides storage space for the data area in FIG. 4.

For another example, if the target data is hot data, when the control unit 310 obtains a second read request used to request the target data, the storage device 300 may read the target data from an SLC indicated by an SLC ID included in the second read request. The SLC ID indicates that the target data is stored in an SLC of the data area. The control unit 310 may parse the SLC ID to determine a chunk in which the target data is stored. For example, the chunk is a second-level storage unit (a small square filled with spots in the physical disk 300B) that provides storage space for the hot spare area in FIG. 4.

The storage device may determine a read location or a write location of the target data based on the data flow ID included in the read request or the write request. This improves the data read/write speed of the storage device, so that data access performance of the storage device is improved.

In an optional implementation, for each first-level storage unit included in a first storage unit set, the storage device 300 may further collects statistics on a quantity of erase times of the first-level storage unit, and performs wear protection on a first-level storage unit whose quantity of erase times reaches a first threshold.

In a possible example, the wear protection is storage unit conversion. For example, the control unit converts the first-level storage unit whose quantity of erase times reaches the first threshold into the second-level storage unit.

The storage device converts the first-level storage unit into the second-level storage unit. This may improve a quantity of remaining P/E times of the second storage unit obtained through conversion in the storage device, so that service life of the storage device is extended and wear leveling of the storage device is implemented.

In a second possible example, the wear protection is data migration. For example, the control unit migrates data stored in the first-level storage unit whose quantity of erase times reaches the first threshold to a first-level storage unit whose quantity of erase times does not reach the first threshold.

Data is migrated between storage units of a same type in the storage device, to balance P/E times of a plurality of storage units that are of a same type, so that load balancing of the storage units in the storage device is achieved, and overall service life of the storage device is extended.

It should be noted that, in a possible case, the control unit may further convert a plurality of second-level storage units into first-level storage units based on usage of each storage unit in the storage device.

For example, when a hard disk in the storage device is faulty, the control unit is further configured to convert the second-level storage unit into the first-level storage unit. The first-level storage unit obtained through conversion is used to restore data stored in the hard disk. If the hard disk is faulty, after cached data in the hot spare area (for example, storage space provided by an SLC) is cleared, the data does not affect service data actually stored in the data area (for example, storage space provided by a QLC). Therefore, the service data stored in the hard disk is not affected by the cached data in the hot spare space. The control unit converts the second-level storage unit (for example, an SLC) that provides storage space for the hot spare area into the first-level storage unit (for example, a QLC), and uses the first-level storage unit to recover data in the faulty hard disk. This ensures data reliability of the storage device.

In this way, a storage unit corresponding to the hot spare area in the storage device may be freely switched. This enriches functions of the hot spare area, and when the hot spare area implements a hot spare function, a caching function of the storage device may be further implemented.

Figure 5:
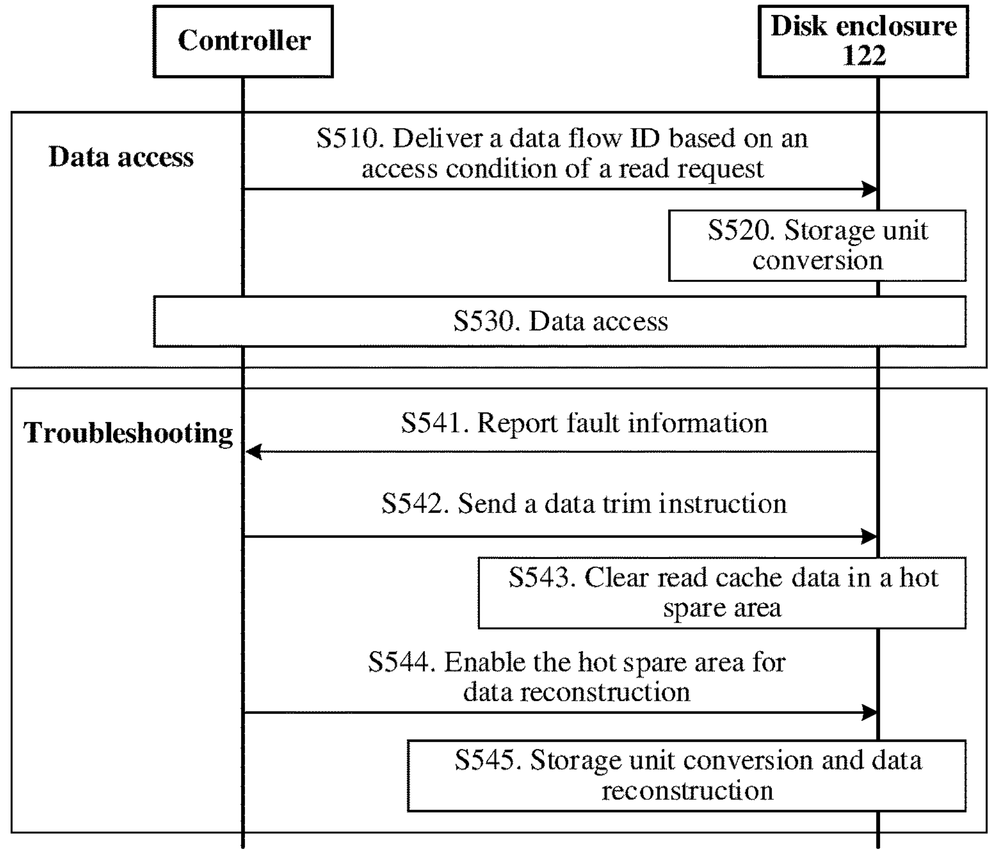
FIG. 5 is a schematic diagram of storage management according to this application.

FIG. 5 is a schematic diagram of storage management according to this application. A storage management process is implemented by a storage system 120. For example, the storage management process is implemented by a disk enclosure 122 and a controller included in an engine 121 in collaboration. The disk enclosure 122 may implement a function of the storage device 300.

As shown in FIG. 5, the storage management process includes a data access process and a troubleshooting process.

The data access process includes the following steps S510 to S530.

S510. The controller delivers a data flow ID based on an access condition of a read request.

The access condition is a cold or hot status of data requested by the read request, or a logical address at which the data is stored. If the logical address is located in an address segment corresponding to a hot spare area, the data flow ID is an SLC ID. For another example, if the logical address is located in an address segment corresponding to a data area, the data flow ID is a QLC ID.

S520. The disk enclosure 122 performs storage unit conversion based on the data flow ID.

For example, after the controller reads data stored in a read cache area in the hot spare area, because a data amount that can be stored in the hot spare area is reduced, and in a subsequent use process of the disk enclosure 122, more hot spare areas need to be used to back up data in the data area, the disk enclosure 122 may convert an SLC that provides storage space for the hot spare area into a QLC.

For another example, after the controller reads data stored in a read cache area in the hot spare area, because data to be read or written in the data area increases within a period of time, the disk enclosure 122 may convert a QLC that provides storage space for the hot spare area into an SLC, to improve an overall read/write speed of the disk enclosure 122, so that data access performance of the storage system 120 is improved.

S530. The controller performs data access on the disk enclosure 122.

The data access includes at least one of writing data and reading data. For details, refer to related descriptions in FIG. 4. Details are not described herein again.

When a part of hard disks in the disk enclosure 122 are faulty, the troubleshooting process provided in this embodiment includes the following steps S541 to S545.

S541. The disk enclosure 122 reports fault information to the controller of the storage system 120.

For example, the fault information indicates that a faulty disk exists in the disk enclosure 122.

S542. The controller sends a data trim instruction to the disk enclosure 122.

For example, the trim instruction indicates the disk enclosure 122 to clear data stored in the SLC that provides the storage space for the hot spare area, and convert the SLC into a QLC. The SLC is used as a read cache, and the data has been stored in a QLC that provides the storage space for the data area. Therefore, a trim operation does not cause loss of original data.

S543. The disk enclosure 122 clears read cache data in the hot spare area.

The read cache data is the data stored in the SLC that provides storage space for the hot spare area. After S543, the disk enclosure 122 may return, to the controller, a response indicating that the read cache data is cleared.

S544. The controller enables the hot spare area for data reconstruction.

For example, when a faulty disk exists in the disk enclosure 122, the controller included in the storage system continues to deliver a QLC data flow ID (QLC ID), and reconstructs data of the faulty disk by using the hot spare area.

S545. The disk enclosure 122 performs storage unit conversion and data reconstruction based on the data flow ID.

For example, the disk enclosure 122 performs dynamic conversion between the QLC and the SLC on a physical chunk based on the data flow ID, and completes the data reconstruction. The data reconstruction includes: The disk enclosure 122 writes backup data of the faulty disk in the hot spare area into a disk newly added to the disk enclosure 122. In a possible case, there is a low probability that an entire disk is unavailable due to a disk fault. After data of the faulty disk is recovered, storage maintenance personnel immediately compensate the disk to replace the faulty disk. Therefore, the hot spare area can be used as an SLC read cache.

In this way, in this embodiment, if a hard disk is faulty, because after data in the hot spare space (storage space provided by the SLC) is trimmed, the data does not affect service data actually stored in the data area (storage space provided by the QLC), the service data stored in the hard disk is not affected by data trimming in the hot spare space. Therefore, the hot spare area is used for acceleration in a data read scenario, and does not affect original data reliability of the storage system.

It may be understood that, to implement the functions in the foregoing embodiments, the storage system and the storage device include corresponding hardware structures and/or software modules for performing each function. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on particular application scenarios and design constraints of the technical solutions.

For example, when the data storage method provided in this application is implemented in a form of a software module, the data storage method may be implemented by a data storage apparatus, for example, the data storage apparatus includes a communication module and a processing module. The communication module is configured to receive or send target data. The processing module is configured to determine a storage location of the target data, implement conversion of a storage module, and the like. For more detailed descriptions of the communication module and the processing module, directly refer to related descriptions in embodiments shown in FIG. 1 to FIG. 5. Details are not described herein again.

For another example, when the data storage method provided in this application is implemented by hardware, the data storage method may be performed by the disk enclosure 122 or the storage system 120 shown in FIG. 1, or may be performed by another storage system in the content described in FIG. 1.

It may be understood that a processor in embodiments of this application may be a CPU, an NPU, or a GPU, or may be another general purpose processor, a digital signal processor (DSP), an application-specific integrated circuit (ASIC), a field programmable gate array (FPGA), or another programmable logic device, a transistor logic device, a hardware component, or any combination thereof. The general purpose processor may be a microprocessor or any regular processor.

The method steps in embodiments of this application may be implemented in a hardware manner, or may be implemented in a manner of executing software instructions by the processor. The software instructions may include a corresponding software module. The software module may be stored in a RAM, a flash, a ROM, a PROM, an EPROM, an electrically erasable programmable read-only memory (electrically EPROM, EEPROM), a register, a hard disk, a removable hard disk, a CD-ROM, or a storage medium of any other form well-known in this field. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist as discrete components in the network device or the terminal device.

All or some of the foregoing embodiments may be implemented by using software, hardware, firmware, or any combination thereof. When software is used to implement embodiments, all or a part of embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a special-purpose computer, a computer network, a network device, user equipment, or another programmable apparatus. The computer programs or instructions may be stored in a computer-readable storage medium, or may be transmitted from one computer-readable storage medium to another computer-readable storage medium. For example, the computer programs or instructions may be transmitted from one website, computer, server, or data center to another website, computer, server, or data center in a wired manner or in a wireless manner. The computer-readable storage medium may be any usable medium that can be accessed by a computer, or a data storage device, for example, a server or a data center, integrating one or more usable media. The usable medium may be a magnetic medium, for example, a floppy disk, a hard disk, or a magnetic tape; or may be an optical medium, for example, a digital video disc (digital video disc, DVD); or may be a semiconductor medium, for example, an SSD.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

The term "a plurality of" means two or more, and another quantifier is similar to this. The term "and/or" describes an association relationship between associated objects and indicates that three relationships may exist. For example, A and/or B may indicate the following three cases: Only A exists, both A and B exist, and only B exists. In addition, an element (element) that appears in singular forms "a", "an", and "the" does not mean "one or only one" unless otherwise specified in the context, but means "one or more". In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A device, comprising:

a controller;

a hot spare area; and a data area, wherein a storage function of the data area is provided by a first storage unit set comprised in the device, and the first storage unit set comprises a plurality of first-level storage units, wherein a storage function of the hot spare area is provided by a plurality of second-level storage units comprised in the device, and a storage capacity of each of the first-level storage units that provides the storage function of the data area is greater than a storage capacity of each of the plurality of second-level storage units that provides the storage function of the hot spare area;

wherein the device further comprises a second storage unit set, the second storage unit set comprises a second plurality of first-level storage units providing the storage function of the hot spare area, the second plurality of first-level storage units is separate from the plurality of first-level storage units, and the plurality of second-level storage units is configured to be obtained by converting the second plurality of first-level storage units comprised in the second storage unit set such that a storage capacity of each of the second plurality of first-level storage units is greater than the storage capacity of each of the plurality of second-level storage units;

wherein the hot spare area always exists in the device after the converting to provide a cache of the device to temporarily store target data; and wherein the controller is configured to write, under a first condition, the target data stored in the hot spare area into the data area.

2. The device according to claim 1, wherein each of the first-level storage units is a multi-level cell (MLC), a triple-level cell (TLC), or a quad-level cell (QLC), and each of the plurality of second-level storage units is a single level cell (SLC);

each of the first-level storage units is a TLC or a QLC, and each of the plurality of second-level storage units is an SLC or an MLC; or each of the first-level storage units is a QLC, and each of the plurality of second-level storage units is an SLC, an MLC, or a TLC.

3. The device according to claim 1, wherein in a running process of the device, the controller is configured to convert the second plurality of first-level storage units comprised in the second storage unit set into the plurality of second-level storage units.

4. The device according to claim 3, wherein the controller is configured to when storage space of the hot spare area is insufficient to store the target data, convert the second plurality of first-level storage units comprised in the second storage unit set into the plurality of second-level storage units.

5. The device according to claim 1, wherein when a hard disk in the device is faulty, the controller is configured to convert the plurality of second-level storage units into the plurality of first-level storage units, wherein the plurality of first-level storage units obtained through conversion is used to restore data stored in the hard disk.

6. A method, performed by a storage device, and the method comprises:

providing, by a first storage unit set comprised in the storage device, a data area, wherein the first storage unit set comprises a plurality of first-level storage units;

providing, by a plurality of second-level storage units comprised in the storage device, a hot spare area, wherein a storage capacity of each of the plurality of first-level storage units that provides the data area is greater than a storage capacity of each of the plurality of second-level storage units that provides the hot spare area;

temporarily storing, by the hot spare area providing a cache of the storage device, target data, wherein the storage device further comprises a second storage unit set, the second storage unit set comprises a second plurality of first-level storage units providing a storage function of the hot spare area, the second plurality of first-level storage units is separate from the plurality of first-level storage units, and the plurality of second-level storage units is configured to be obtained by converting the second plurality of first-level storage units comprised in the second storage unit set such that a storage capacity of each of the second plurality of first-level storage units is greater than the storage capacity of each of the plurality of second-level storage units;

wherein the hot spare area always exists in the storage device after the converting to provide the cache of the storage device; and writing, by a controller comprised in the storage device, the target data stored in the hot spare area into the data area under a first condition.

7. The method according to claim 6, wherein each of the first-level storage units is a multi-level cell (MLC), a triple-level cell (TLC), or a quad-level cell (QLC), and each of the plurality of second-level storage units is a single level cell (SLC);

each of the first-level storage units is a TLC or a QLC, and each of the plurality of second-level storage units is an SLC or an MLC; or each of the first-level storage units is a QLC, and each of the plurality of second-level storage units is an SLC, an MLC, or a TLC.

8. The method according to claim 6, wherein the method further comprises:

in a running process of the storage device, converting, by the controller, the second plurality of first-level storage units comprised in the second storage unit set into the plurality of second-level storage units.

9. The method according to claim 8, wherein converting, by the controller, the second plurality of first-level storage units comprised in the second storage unit set into the plurality of second-level storage units comprises:

when storage space of the hot spare area is insufficient to store the target data, converting, by the controller, the second plurality of first-level storage units comprised in the second storage unit set into the plurality of second-level storage units.

10. The method according to claim 6, wherein the method further comprises:

when a hard disk in the storage device is faulty, converting, by the controller, the plurality of second-level storage units into plurality of the first-level storage units, wherein the plurality of first-level storage units obtained through conversion is used to restore data stored in the hard disk.

11. A system, comprising:

a controller configured to obtain target data, and send the target data to a storage device; and the storage device, wherein the storage device is configured to temporarily store the target data in a hot spare area comprised in the storage device, and a controller of the storage device is configured to write, under a first condition, the target data from the hot spare area into a data area comprised in the storage device, wherein a storage function of the data area is provided by a first storage unit set comprised in the storage device, and the first storage unit set comprises a plurality of first-level storage units, wherein a storage function of the hot spare area is provided by a plurality of second-level storage units comprised in the storage device, and a storage capacity of each of the first-level storage units that provides the storage function of the data area is greater than a storage capacity of each of the plurality of second-level storage units that provides the storage function of the hot spare area, wherein the storage device further comprises a second storage unit set, the second storage unit set comprises a second plurality of first-level storage units providing the storage function of the hot spare area, the second plurality of first-level storage units is separate from the plurality of first-level storage units, and the plurality of second-level storage units is configured to be obtained by converting the second plurality of first-level storage units comprised in the second storage unit set such that a storage capacity of each of the second plurality of first-level storage units is greater than the storage capacity of each of the plurality of second-level storage units, and wherein the hot spare area always exists in the storage device after the converting to provide a cache of the storage device to temporarily store target data.

12. The storage device according to claim 11, wherein each of the first-level storage units is a multi-level cell (MLC), a triple-level cell (TLC), or a quad-level cell (QLC), and each of the plurality of second-level storage units is a single level cell (SLC);

each of the first-level storage units is a TLC or a QLC, and each of the plurality of second-level storage units is an SLC or an MLC; or each of the first-level storage units is a QLC, and each of the plurality of second-level storage units is an SLC, an MLC, or a TLC.

13. The storage device according to claim 11, wherein in a running process of the storage device, the controller of the storage device is configured to convert the second plurality of first-level storage units comprised in the second storage unit set into the plurality of second-level storage units.

14. The storage device according to claim 13, wherein the controller of the storage device is configured to: when storage space of the hot spare area is insufficient to store the target data, convert the second plurality of first-level storage units comprised in the second storage unit set into the plurality of second-level storage units.

15. The storage device according to claim 11, wherein when a hard disk in the storage device is faulty, the controller of the storage device is configured to convert the plurality of second-level storage units into the plurality of first-level storage units, wherein the plurality of first-level storage units obtained through conversion is used to restore data stored in the hard disk.

* * * * *